(12) United States Patent
Dell'erba et al.

(10) Patent No.: US 11,359,303 B2
(45) Date of Patent: Jun. 14, 2022

(54) THREADED JOINT FOR AN OIL WELL PIPE

(71) Applicant: Tenaris Connections B.V., Amsterdam (NL)

(72) Inventors: Diego Dell'erba, Buenos Aires (AR); Gaston Mazzaferro, Buenos Aires (AR); Juan Carlos Gonzalez, Luxembourg (LU)

(73) Assignee: Tenaris Connections B.V., Amsterdam (NL)

( * ) Notice: Subject to any disclaimer, the term of this patent is extended or adjusted under 35 U.S.C. 154(b) by 0 days.

(21) Appl. No.: 16/692,231

(22) Filed: Nov. 22, 2019

(65) Prior Publication Data

US 2020/0157700 A1   May 21, 2020

Related U.S. Application Data

(62) Division of application No. 15/119,532, filed as application No. PCT/NL2015/050103 on Feb. 19, 2015, now Pat. No. 10,513,793.

(30) Foreign Application Priority Data

Feb. 19, 2014  (NL) ..................................... 2012288

(51) Int. Cl.
*E21B 17/042* (2006.01)
*C09D 5/08* (2006.01)
(Continued)

(52) U.S. Cl.
CPC ............... *C25D 13/04* (2013.01); *C09D 5/08* (2013.01); *C23F 11/10* (2013.01); *C25D 13/20* (2013.01); *C25D 13/22* (2013.01); *F16L 58/182* (2013.01)

(58) Field of Classification Search
CPC ............ C09D 5/08; E21B 17/042; F16L 15/00
(Continued)

(56) References Cited

U.S. PATENT DOCUMENTS 3,475,384 A   10/1969  Trischler
3,852,222 A   12/1974  Field et al.
(Continued)

FOREIGN PATENT DOCUMENTS

DE   3324211   1/1985
DE   42 05 819   9/1993
(Continued)

OTHER PUBLICATIONS

Journal of Petroleum Technology article, Mar. 1967, p. 337, "New Technology For Improved Tubular Connection Performance", by P. D. Weiner and F. D. Sewell.
(Continued)

*Primary Examiner* — Zakiya W Bates
*Assistant Examiner* — Ashish K Varma
(74) *Attorney, Agent, or Firm* — Knobbe Martens Olson & Bear, LLP (57) ABSTRACT

Oil well pipe component comprising a threaded portion, at least part whereof is coated with a layer of a corrosion-inhibiting material, that has been applied to at least the part of the threaded portion of the oil well pipe component by means of a method comprising a cataphoresis step from an aqueous bath, said method comprising
  providing the oil well pipe component comprising a threaded portion;
  immersing at least part of the threaded portion of the pipe component in a cataphoresis bath comprising water and suspended particles of corrosion-inhibiting material, and provided with an anode and a cathode means, the pipe component being connected to the cathode means;
(Continued)

According to prior art inducing a current through the bath, in order to provide the corrosion-inhibiting material with a positive charge;

depositing a layer of the positively charged corrosion-inhibiting material onto the pipe component; and removing the immersed part of the pipe component with the layer of corrosion-inhibiting material from the cataphoresis bath and allowing the corrosion-inhibiting material to set.

15 Claims, 1 Drawing Sheet

(51) Int. Cl.
C25D 13/04 (2006.01)
F16L 58/18 (2006.01)
C23F 11/10 (2006.01)
C25D 13/20 (2006.01)
C25D 13/22 (2006.01)

(58) Field of Classification Search
USPC .................................... 285/45; 166/307
See application file for complete search history.

(56) References Cited

U.S. PATENT DOCUMENTS

| | | |
|---|---|---|
| 3,922,253 A | 11/1975 | Jerabek et al. |
| 4,018,944 A | 4/1977 | Hallstrom et al. |
| 4,089,690 A | 5/1978 | Pantzer et al. |
| 4,121,000 A | 10/1978 | Wald |
| 4,157,358 A | 7/1979 | Field et al. |
| 4,233,088 A | 11/1980 | Kronstein |
| RE30,691 E | 7/1981 | Hallstrom et al. |
| 4,414,247 A | 11/1983 | Hubecker et al. |
| 4,544,581 A | 10/1985 | Pelloski |
| 4,692,988 A | 9/1987 | Shulver et al. |
| 4,728,546 A | 3/1988 | Rasmussen |
| 4,720,518 A | 6/1988 | Chihara et al. |
| 4,816,545 A | 3/1989 | Re et al. |
| 4,818,619 A | 4/1989 | Strepparola et al. |
| 4,840,668 A | 6/1989 | Gawol et al. |
| 4,845,136 A | 7/1989 | Saito et al. |
| 4,868,066 A | 9/1989 | Whitmore |
| 5,059,640 A | 10/1991 | Hegedus et al. |
| 5,130,361 A | 7/1992 | Hegedus et al. |
| 5,157,066 A | 10/1992 | Shoji et al. |
| 5,192,447 A | 3/1993 | Fivizzani |
| 5,202,367 A | 4/1993 | Hegedus et al. |
| 5,216,067 A | 6/1993 | Yamada et al. |
| 5,253,902 A | 10/1993 | Petelot et al. |
| 5,352,726 A | 10/1994 | Hall |
| 5,385,655 A * | 1/1995 | Brent .................. B05D 7/542 148/246 |
| 5,386,005 A | 1/1995 | Mascia et al. |
| 5,427,632 A | 6/1995 | Dolan |
| 5,449,415 A | 9/1995 | Dolan |
| 5,470,910 A | 11/1995 | Spanhel et al. |
| 5,498,657 A | 3/1996 | Sugiyama et al. |
| 5,633,086 A | 5/1997 | Hsu et al. |
| 5,645,890 A * | 7/1997 | MacDiarmid ............ B05D 7/16 427/302 |
| 5,716,679 A | 2/1998 | Krug et al. |
| 5,728,465 A | 3/1998 | Dorfman et al. |
| 5,753,316 A | 5/1998 | Brent et al. |
| 5,760,126 A | 6/1998 | Engle et al. |
| 5,910,522 A | 6/1999 | Schmidt et al. |
| 5,958,847 A | 9/1999 | Engle et al. |
| 5,959,426 A | 9/1999 | Moeller et al. |
| 5,976,337 A | 11/1999 | Korinko et al. |
| 5,994,447 A | 11/1999 | Shim et al. |
| 6,008,285 A | 12/1999 | Kasemann et al. |
| 6,027,145 A | 2/2000 | Tsuru et al. |
| 6,040,414 A | 3/2000 | Temtchenko et al. |
| 6,071,564 A | 6/2000 | Marchetti et al. |
| 6,121,208 A | 9/2000 | Toyota |
| 6,168,866 B1 | 1/2001 | Clark |
| 6,187,426 B1 | 2/2001 | Jonschker et al. |
| 6,228,921 B1 | 5/2001 | Kasemann et al. |
| 6,287,639 B1 | 9/2001 | Schmidt et al. |
| 6,291,070 B1 | 9/2001 | Arpac et al. |
| 6,303,730 B1 | 10/2001 | Fries et al. |
| 6,316,084 B1 | 11/2001 | Claus et al. |
| 6,362,135 B1 | 3/2002 | Greer |
| 6,378,599 B1 | 4/2002 | Schmidt et al. |
| 6,379,801 B1 | 4/2002 | Falcone et al. |
| 6,403,164 B1 | 6/2002 | Jonschker et al. |
| 6,419,147 B1 | 7/2002 | Daniel |
| 6,455,103 B1 | 9/2002 | Mennig et al. |
| 6,500,534 B1 | 12/2002 | Dittfurth et al. |
| 6,503,304 B2 | 1/2003 | Korn et al. |
| 6,517,617 B1 | 2/2003 | Chartier et al. |
| 6,576,182 B1 | 6/2003 | Ravagni et al. |
| 6,579,472 B2 | 6/2003 | Chung et al. |
| 6,579,835 B2 | 6/2003 | Scicchitano et al. |
| 6,592,977 B2 | 7/2003 | Thomas et al. |
| 6,638,600 B2 | 10/2003 | Gazo |
| 6,659,509 B2 | 12/2003 | Goto et al. |
| 6,679,526 B2 | 1/2004 | Yamamoto et al. |
| 6,746,057 B2 | 6/2004 | Goto et al. |
| 6,758,916 B1 | 7/2004 | McCormick |
| 6,764,984 B2 | 7/2004 | Beatty |
| 6,790,532 B1 | 9/2004 | Gier et al. |
| 6,827,996 B2 | 12/2004 | Goto |
| 6,855,386 B1 | 2/2005 | Daniels et al. |
| 6,855,396 B1 | 2/2005 | Menning et al. |
| 6,869,111 B2 | 3/2005 | Goto et al. |
| 6,875,479 B2 | 4/2005 | Jung et al. |
| 6,896,958 B1 | 5/2005 | Cayton |
| 6,921,110 B2 | 7/2005 | Morotti et al. |
| 6,971,681 B2 | 12/2005 | Dell'Erba et al. |
| 6,995,222 B2 | 2/2006 | Buckanin et al. |
| 7,037,596 B1 | 5/2006 | Benthien et al. |
| 7,041,728 B2 | 5/2006 | Zippplies |
| 7,053,149 B2 | 5/2006 | Anderson et al. |
| 7,169,834 B2 | 1/2007 | Dobler et al. |
| 7,235,292 B2 | 6/2007 | Hayashida et al. |
| 7,279,173 B2 | 10/2007 | Schiestel et al. |
| 7,297,748 B2 | 11/2007 | Trivedi |
| 7,342,066 B2 | 3/2008 | Dadalas et al. |
| 7,360,798 B2 | 4/2008 | Matsumoto et al. |
| 7,390,532 B2 | 6/2008 | Dellwo et al. |
| 7,473,521 B2 | 1/2009 | Harada et al. |
| 7,473,721 B2 | 1/2009 | Harada et al. |
| 7,498,362 B2 | 3/2009 | Ramsey |
| 7,662,241 B2 | 2/2010 | Sinko |
| 7,770,935 B2 | 8/2010 | Imai et al. |
| 7,866,706 B2 | 1/2011 | Goto et al. |
| 7,883,118 B2 | 2/2011 | Goto et al. |
| 7,906,462 B2 * | 3/2011 | Mesher .................. C09K 8/72 507/203 |
| 8,322,754 B2 | 12/2012 | Carcagno et al. |
| 8,562,711 B2 | 10/2013 | Sutton |
| 8,758,876 B2 | 6/2014 | Carcagno et al. |
| 10,513,793 B2 | 12/2019 | Dell'Erba et al. |
| 2002/0013425 A1 | 1/2002 | Johnson et al. |
| 2003/0059540 A1 | 3/2003 | Berni et al. |
| 2003/0159764 A1 | 8/2003 | Goto |
| 2003/0160446 A1 | 8/2003 | Goto |
| 2004/0113423 A1 | 6/2004 | Dell'Erba et al. |
| 2004/0195826 A1 | 10/2004 | Goto |
| 2004/0265233 A1 | 12/2004 | Holzer et al. |
| 2005/0003203 A1 | 1/2005 | Brown |
| 2005/0176592 A1 * | 8/2005 | Calvo .................. C10M 169/04 508/128 |
| 2006/0014895 A1 | 1/2006 | Shiono |
| 2006/0057398 A1 | 3/2006 | Zimmermann et al. |
| 2006/0089442 A1 | 4/2006 | Menning et al. |
| 2006/0153993 A1 | 7/2006 | Schmidt et al. |
| 2006/0154091 A1 | 7/2006 | Schmidt et al. |
| 2006/0159909 A1 | 7/2006 | Aslan et al. |
| 2006/0159923 A1 | 7/2006 | Becker-Willinger et al. |

(56) References Cited

U.S. PATENT DOCUMENTS

| | | | |
|---|---|---|---|
| 2006/0194886 A1 | 8/2006 | Adam et al. | |
| 2006/0228505 A1 | 10/2006 | Goto et al. | |
| 2007/0044906 A1 | 3/2007 | Park | |
| 2007/0048540 A1 | 3/2007 | Ragunathan et al. | |
| 2008/0008838 A1 | 1/2008 | Arpac et al. | |
| 2008/0277925 A1 | 11/2008 | Goto | |
| 2010/0301600 A1* | 12/2010 | Goto | C10M 129/70 |
| | | | 285/333 |
| 2012/0112456 A1 | 5/2012 | Tomomitsu et al. | |

FOREIGN PATENT DOCUMENTS

| | | |
|---|---|---|
| DE | 197 46 885 | 6/1999 |
| DE | 198 59 686 | 6/2000 |
| DE | 100 53 954 | 10/2000 |
| DE | 101 49 148 | 5/2002 |
| DE | 100 59 487 | 6/2002 |
| DE | 10 2004 008772 | 9/2005 |
| EP | 0 082 291 | 6/1983 |
| EP | 0 178 531 | 4/1986 |
| EP | 0 209 857 | 1/1987 |
| EP | 0 227 975 | 7/1987 |
| EP | 0 230112 | 7/1987 |
| EP | 0 234 395 | 9/1987 |
| EP | 0 245 786 | 11/1987 |
| EP | 0 261 385 | 3/1988 |
| EP | 0 310 971 | 4/1989 |
| EP | 0 333 327 | 9/1989 |
| EP | 0 414 199 | 2/1991 |
| EP | 0 456 270 | 11/1991 |
| EP | 0 476 514 | 3/1992 |
| EP | 0 570 254 | 11/1993 |
| EP | 0 812 891 | 9/1997 |
| EP | 0 810 259 | 12/1997 |
| EP | 0 848 023 | 6/1998 |
| EP | 0 973 958 | 1/2000 |
| EP | 1 068 372 | 1/2001 |
| EP | 1 093 032 | 4/2001 |
| EP | 1 211 451 | 5/2002 |
| EP | 1 284 307 | 2/2003 |
| EP | 1 548 346 | 5/2003 |
| EP | 1 378 699 | 1/2004 |
| EP | 1 462 496 | 9/2004 |
| EP | 1 614 718 | 7/2005 |
| EP | 1 718 690 | 11/2006 |
| EP | 1 757 442 | 2/2007 |
| GB | 2008618 | 6/1979 |
| JP | 2001065752 | 8/1990 |
| JP | 07228962 | 2/1994 |
| JP | 2001065754 | 8/1999 |
| JP | 2001099364 | 8/1999 |
| JP | 2006102744 | 10/2005 |
| WO | WO 1989/03739 | 5/1989 |
| WO | WO 1995/13326 | 5/1995 |
| WO | WO 1997/16479 | 10/1996 |
| WO | WO 1997/46285 | 12/1997 |
| WO | WO 1998/22241 | 5/1998 |
| WO | WO 1999/11725 | 3/1999 |
| WO | WO 1999/50477 | 10/1999 |
| WO | WO 2000/37577 | 12/1999 |
| WO | WO 2000/63312 | 4/2000 |
| WO | WO 2000/40633 | 7/2000 |
| WO | WO 2000/59554 | 8/2002 |
| WO | WO 2002/079325 | 10/2002 |
| WO | WO 2003/099735 | 12/2003 |
| WO | WO 2005/080465 | 9/2005 |
| WO | WO 2005/105304 | 11/2005 |
| WO | WO 2005/105706 | 11/2005 |
| WO | WO 2005/120154 | 12/2005 |
| WO | WO 2006/020857 | 2/2006 |
| WO | WO 2006/037591 | 4/2006 |
| WO | WO 2006/066856 | 6/2006 |
| WO | WO 2006/066858 | 6/2006 |
| WO | WO 2006/075774 | 7/2006 |
| WO | WO 2006/077124 | 7/2006 |
| WO | WO 2006/077125 | 7/2006 |
| WO | WO 2006/077140 | 7/2006 |
| WO | WO 2006/104251 | 10/2006 |
| WO | WO 2007/063079 | 7/2007 |
| WO | WO 2008/090411 | 7/2008 |
| WO | WO 2009/072486 | 6/2009 |
| WO | WO 2012/010981 | 6/2013 |
| WO | WO 2013/176281 | 11/2013 |

OTHER PUBLICATIONS

Arenas, M. A., et al.: "X-ray photoelectron study of the corrosion bevaviour of galvanised steel implanted with rare earths", Corrorision Science 46 (2004),1033-1049.
Asmatulu, R., et al.: "Corrosion Protection of Materials by Applying Nanotechnology Associated Studies", Mat. Res. Soc. Symp. Proc. Vo. 7882004 Materials Research Society.
Birkholz, von M., et al.: "Metalloxid-Metall Nanokompositschichten fur VerschleiB- und Korrosionsschutz", Tribologie & Schmierungstechnik, 51 Jahrgang Mar. 2004.
Bram, Ch., et al.: "Self assembled molecular monolayers on oxidized inhomogeneous aluminum surfaces", Fresenius J. Anal. Chem. (1997) 358, 108-111.
Buchwal Ter, L. P., "Adhesion of polyidies to metal and ceramic surfaces: an overview", J. Adhesion Sci. Technol. vol. 4, No. 9, pp. 697-721 (1990).
Chan, C.M., "Polymer Surface Modification and Characterization", Munich: Hanser Publisher; 1994 (front and back cover, title page, and copyright page submitted).
Dillingham, R. G., et al.: "The Adhesion of Isocyanate-Based Polymers to Steel", J. of Adhesion, 2003, 79, 269-285, pp. 269-285.
Hougham G., Cassidy P.E., Johns K., Davidson T., Editors, "Fluoropolymers 1 and 2", New York Kluwer Academic/Plenum Publishers; 1999. (front and back covers, title pages, and copyright pages submitted).
Jain, A., et al.: "A quantitative study of moisture adsorption in polyimide and its effect on the strength of the polyimide/silicon nitride interface", Acta Materialia, 53 (2005) 3147-3153.
Jimenez-Morales, A.; Simancas, J.; Garcia-Urena, J. A.; Galvan, J. C., "Nanocomposite materials with controlled ion-mobility for the development of anticorrosive coatings with high metal/polymer adhesion", International Corrosion Congress: Frontiers in Corrosion Science and Technology; 15th, Granada, Spain, Sep. 22-27, 2002 (2002), 460/1-460/8 Publisher: National Centre for Metallurgical Research, Madrid Spain.
Li, et al.: "Preparation and Characterization of Transparent ZnO/epoxy nanocomposites with high-UV shielding efficiency", Polymer 47 (2006) 212-2132.
Liu et al.: Co-deposition of titanium / polytetrafluoroethylene films by unbalanced mangetron sputtering, Surface and Coatings Technology 149 (2002) 143-150.
Llevbare, G. 0., et al.: The inhibition of pitting corrosion of stainless steels by chromate and molybdate ions, Corrorsion Science 45 (2003) 1545-1569.
Matuszczak, S. et al.: "An approach to fluorinated surface coatings via photoinitiated cationic cross-linking of mixed epoxy and fluoroepoxy systems", Journal of Fluorine Chemistry 102 (2000) 269-277.
McCook, N. L., et al.: "Epoxy ZnO, and PTFE Nanocomposite: Friction and Wear Optiminization", Tribology Letters, vol. 22 No. 3:253-257 Jun. 2006.
Montefusco, F., et al.: "New Difunctional Fluoro-expoxide Monomers: Synthesis, Photopolymerization and Charactrization", Polymer, 45 (2004) 4663-4668.
Racicot, R. et al.: "Corrosion Protection of Aluminium Alloys by Double-Strand Polyaniline", Synthetic Metals 85 (1997) 1263-1264.
Romagnoli, R., et al.: "High performance anticorrosive epoxy paints pigmented with zinc molybdenum phosphate", Jocca-Surface Coatings International 83 (1): 27-32 Jan. 2000, pp. 27-32.
Sangermano, M., et al.: "Fluorinated epoxides as surface modifying agents of UV-curable systems", J Appl Polym Sci 2003; 89:1529.

(56) References Cited

OTHER PUBLICATIONS

Schiers, editor, "Modern Fluoropolymers", New York: Wiley; 1997. (front and back cover, title page, and copyright page submitted).

Schnurer et al.: "Photopolymerized Expoxide Copolymer Thin Films with Surfaces Highly Enriched with Sulfonyl Floride Groups", Chern Mater, 1996, 8, 1475-1481.

Steyer et al.: "Improvement of high temperature corrosion resistance of tool steels by nanostructured PVD coatings", Materials Science Forum ols. 426-432, (2003) pp. 2503-2508.

Veleva, L., et al.: "Corrosion electrochemical behavior of epoxy anticorrosive paints based on zinc molybdenum phosphate and zinc oxide", Progress in Organic Coatings 36 (1999), 211-216, pp. 211-216.

Voevodin, N. N., et al.: "Evaluation of Corrosion Protection Performance of Sol-Gel Surface Treatments on AA2024-T3", 33rd International SAMPE Technical Conference, Nov. 5-8, 2001, 983-997.

Walter, G.W.: "A Critical Review of the Protection of Metals by Paints", Corrosion Science, vol. 26, No. 1, pp. 27-38, 1986.

Yu, Y. H., et al.: "Preparation and Properties of Polyimide-Clay Nanocomposite Materials for Anticorrosion Application", Journal of Applied Polymer Science, Jun. 15, 2004, vol. 92, No. 6, 3573-3582.

Zhang, Ergeng; Long, Kang; Wang, Zhiwen, "Corrosion resistance of nanocomposite coatings on carbon steel by using EIS measurement", Fushi Kexue Yu Fanghu Jishu; (2002), 14(6),337-339 CODEN: FKFJED; ISSN: 1002-6495.

Zhu, Y., J.O. Iroh, "Electrochemical Synthesis of Polyaniline Films in the PRescence of Inorganic Fillers and Their Effects on Corrosion Protection of Al 2024-T3", Journal of Advanced Materials, 2002, 34, 16-21.

\* cited by examiner

FIGURE 1;   According to prior art

FIGURE 2;   According to invention

THREADED JOINT FOR AN OIL WELL PIPE

The present invention relates to an oil well pipe component comprising a threaded portion that is coated with at least a layer of a corrosion-inhibiting material. The invention further relates to a method for applying a layer of a corrosion inhibiting material to the oil well pipe component.

Pipes and components thereof often require a coating that prevents the pipe or the component in question from corrosion. That particularly applies to threaded pipes that are used in the oil and gas industry. In this industry pipe segments having threaded portions can be joint to form a pipeline or pipe string. The pipe segments may for example be joined by means of connectors that have internal threaded portions and mate with the external threaded portions of the pipe segments. In other embodiments, an external threaded portion of a pipe segment is connected with an internal threaded portion of another pipe segment. The pipe segments with one or more external threaded portions are often referred to as the male component of the joint, or as pin members. The internal threaded portions in the pipe segments or in the connectors are referred to as the female components of the joint or as box members.

As described in US 2004/0113423, in the oil fields it is common practice to use metallic pipes of a predefined length, joined to form such a string to reach the depth in which there are oil or gas reservoirs or pools for their extraction. This extraction technique requires to gradually case the well internally, during its boring, which is performed with metallic tubes, the so-called casing of the well. Once the desired depth is reached, there is placed a string of metallic pipes of smaller diameter, the so-called tubing, to pump the gaseous or liquid hydrocarbons to the surface. Both casing and tubing strings are formed of pipe segments, which are joined together using threaded connectors.

It is evident that the use of these tubing and casing strings are subjected to a harsh environment where corrosion and galling may easily occur. By corrosion is understood the gradual destruction of the metals in the steel object by chemical reactions with its environment. Usually this refers to the degradation of the steel object due to the reaction with an oxidant, such as oxygen itself. By galling is meant the formation of surface damage that arises between sliding surfaces having metal-to-metal contact. Galling may be caused by unevenness of the sliding surfaces.

For these reasons it is customary to coat the tubing and casing strings, and in particular the threaded portions of these strings with a protective coating to render the strings better resistant to corrosion and galling. In the above-mentioned US 2004/0113423 it has been described that the threaded portion of a pipe segment having external threads has been coated with a first layer of a corrosion-inhibiting material and a second layer of a lubricant coating. It is observed that the female component of the joint, having internal threads, may be left without protective layers and be connected to a male component with the protective layer.

Although this may be a satisfactory solution, when the male and female components have been mated, it leaves the female component unprotected during transport and storage. To overcome this problem US 2004/0113423 also discloses the possibility to coat both the male and the female components. As examples of methods to apply the layers reference is made to spraying, dipping and brushing.

As an alternative solution, it is proposed in US 2012/0112456 to apply a photocurable coating to at least one of the threaded portions of a pin and a box, and cure the composition. Also these coatings are applied onto the substrate by spraying, showering, dipping, or by roll application.

A drawback of these methods for applying a layer of protective coating resides in that the uniformity of the layer thickness cannot be guaranteed. As indicated above, galling can be caused by unevenness of the sliding parts. When the surface of threaded portion of a male or female member is not sufficiently even, galling may arise. In addition, when the coatings are not uniform, fluctuations in torque may occur. The sealing mechanisms of commonly used types of threaded tubular connections is discussed in a Journal of Petroleum Technology article, March 1967, page 337, "New Technology For Improved Tubular Connection Performance", by P. D. Weiner and F. D. Sewell. The authors indicate inter alia that connection make-up torque depends primarily on the friction between the mating pin and box threads which, for clean connections, is largely a function of the type of thread compound employed. The authors show that employing different types of thread compounds can cause connection make-up torque variations of up to 500 percent. It is evident that when the coatings of the connection is non uniform the friction may increase and thus the torque may fluctuate.

In U.S. Pat. No. 5,645,890 reference is made to a study wherein the intrinsically conductive polymer polyaniline is deposited electrochemically on stainless steel. It is, however, observed that these coatings are not applicable for the prevention of corrosion of most metal structures. Therefore, U.S. Pat. No. 5,645,890 discloses the prevention of corrosion on metal objects by using a polyaniline coating that has been applied by spraying a polyaniline solution, brushing such a solution or immersing the metal surface in such a solution. The polyaniline has been dissolved in an organic solvent such as dimethylsulphoxide, N-methyl pyrrolidone (NMP), and tetramethyl urea.

Polyaniline has also been considered for use as corrosion-inhibiting material in tubing and casing strings, as disclosed in US 2005/0176592. This application aims at protecting the internal threading of a female component of a joint with polyaniline and a lubricant whilst the male component of the joint may be coated with polyaniline only. According to the disclosure of US 2005/0176592 the polyaniline may be deposited onto the threaded portion of the box and pin by means of spraying, brushing, electrophoresis and electropolymerization of the monomer or monomers. In order to apply the polyaniline, the polyaniline is taken up in a solution with NMP. In an example the solution of polyaniline in NMP is sprayed over the metal surface to be treated.

A drawback of the known process is that the method requires large amounts of volatile organic solvents. The evaporation thereof is environmentally unfriendly. Further, it is evident that this application fails to recognize that the evenness of the layer of corrosion-inhibiting material can be improved if spraying is replaced by an electrochemical deposition method. Moreover, as is known from Bull. Chem. Soc. Jpn, 57, 2254-2257, (1984) polyaniline can be anodically deposited onto an anode electrode.

In order to overcome the drawbacks of the prior art it has now been found that when cataphoresis from an aqueous bath is used in the deposition of corrosion-inhibiting material onto an oil well pipe component, a layer with a uniform thickness is obtained. Moreover, since water is the main liquid diluent for the corrosion-inhibiting material, the process for preparing the layer by cataphoresis does not incur a significant evaporation of organic vapors.

Accordingly, the present invention provides an oil well pipe component comprising a threaded portion that is a sleeve-shaped coupling member for a cylindrical oil well pipe, comprising an internal threaded portion, or a cylindrical oil well pipe comprising an external threaded portion, wherein at least part of the threaded portion is coated with a layer of a corrosion-inhibiting material, that has been applied to at least the part of the threaded portion of the oil well pipe component by means of cataphoresis from an aqueous bath.

The invention also provides a method for coating an oil well pipe component comprising a threaded portion with a layer of a corrosion-inhibiting material, comprising providing an oil well pipe component comprising a threaded portion, which is a sleeve-shaped coupling member for a cylindrical oil well pipe, comprising an internal threaded portion, or a cylindrical oil well pipe comprising an external threaded portion;

immersing at least part of the threaded portion of the pipe component in a cataphoresis bath comprising water and suspended particles of corrosion-inhibiting material, and provided with an anode and a cathode means, the pipe component being connected to the cathode means;

inducing a current through the bath, in order to provide the corrosion-inhibiting material with a positive charge;

depositing a layer of the positively charged corrosion-inhibiting material onto the pipe component; and removing the immersed part of the pipe component with the layer of corrosion-inhibiting material from the cataphoresis bath and allowing the corrosion-inhibiting material to set.

It is understood that the oil well pipe component according to the invention includes pipe components that are suitable for oil well applications. That implies that also the pipe components according to the invention may also be used in other field applications, such as the exploration and production of gas.

The present invention allows the provision of an oil well pipe component, made from steel or alloys, such as a pin member or a box member that has been prepared in an environmentally friendly way and with a thin layer of corrosion-inhibiting material which layer has a uniform thickness. This represents a considerable advantage over the prior art documents mentioned that employ a different way of application. Also US 2005/0176592, which mentions electrophoresis, suggesting anodic deposition, and also indicates that polyaniline is to be deposited from an organic solution, fails to suggest the present invention. From U.S. Pat. No. 5,976,337 it is known that electrophoretic depositions may be conducted in a bath comprising organic solvents with low viscosity and low surface tension, including nitrogen-containing solvents. Hence, none of these documents mentioned above teaches or suggests that the provision of a coating of a corrosion-inhibiting layer by means of cataphoresis from a water-containing bath would lead to a uniform thickness of such layer. A box member and pin member may also comprise unthreaded portions. These unthreaded portions comprise for instance torque shoulders and metal-to-metal sealing surfaces in oil well pipe components. When the oil well pipe component is being subjected to cataphoresis such unthreaded portions are also advantageously coated with corrosion-inhibiting material in an even way. Since the coatings on also the metal-to-metal sealing surfaces comprise a coating with an even thickness, the sealing action is facilitated.

Here it is noted that electrophoretic deposition of a corrosion-inhibiting coating on small objects, such as bolts and nuts for use in industry, automotive and aerospace is known per se, e.g. from WO 2006/020857, GB 2008618, U.S. Pat. Nos. 5,753,316 and 5,385,655. In these technical fields such small objects do not encounter problems relating to galling, lubricating and torque fluctuations as occur in land and marine oil fields, in particular during the make-up of the operation.

Typically the oil well pipe component according to the invention belongs to the so called Oil Country Tubular Goods (OCTG), which satisfy API Specification SCT. OCTG like tubing and casing are used in the excavation of oil wells for exploration of oil and gas fields. At present, deep oil wells e.g. in offshore oil fields may reach up to a depth of 10 000 meters. Typically the well pipes having a defined length of several tens of meters are mutually connected by threaded joints using a sleeve-shaped coupling member. Airtightness of the threaded joints is mandatory. Upon use the threaded joints for connecting OCTG are exposed to axial tensile forces that are caused by the weight of the OCTG and the threaded joints. Furthermore, the internal and external pressure are important parameters. Even under these harsh conditions prevailing in oil and gas fields the threaded joints need to maintain airtightness.

Typically the threaded joint for OCTG comprises a pin-box structure. A pin member is a male threaded end portion of an oil well pipe. A box member is a female threaded portion on the inner surface of the sleeve-shaped coupling member. Usually an unthreaded contact section is present at the end of the male thread of the pin. A matching unthreaded metal contact section is also present at the base of the female thread in the sleeve-shaped coupling member. Moreover, the sleeve-shaped coupling member may comprise a contact shoulder. Upon inserting the pin member into the box member and fastening the threads thereof to one another, the unthreaded contact sections will contact each other, thereby forming a metal-to-metal seal. This seal ensures the required airtightness.

In the oil well pipe component the threaded portion thereof is at least partly coated with a layer of a corrosion-inhibiting material. The corrosion-inhibiting material can be selected from known corrosion-inhibiting materials. It is evident that for the present invention the corrosion-inhibiting material must be capable of being deposited onto a pipe element in a cataphoresis process. Such materials are well-known in the art. In particular in the art of the production of bodies for automobiles many corrosion-inhibiting materials are known. Suitably the corrosion-inhibiting material comprises a resin that is responsive to an electric field. Typically, the resin is selected from the group consisting of polyolefins, saturated and unsaturated polyesters, alkyd resins, acrylic resins, phenolic resins, polyamides, epoxy resins and polyurethane resins. It has been found that very good results are obtainable when the corrosion-inhibiting material comprises a basic resin. In particular amino epoxy resins and amino-urethane resins and combinations thereof yield very good results. Many such corrosion-inhibiting materials are commercially available. Examples of base resins that can be used in cataphoresis baths are described in a large number of patent documents, including EP-A-082 291, EP-A-234 395, EP-A-209 857, EP-A-227 975, EP-A-178 531, EP-A-333 327, EP-A-310 971, EP-A-456 270, U.S. Pat. No. 3,922,253, EP-A-261 385, EP-A-245 786, DE-33 24 211, EP-A-414 199 and EP-A-476 514. The resins described therein can be used alone or in a mixture.

Good results have been obtained with corrosion-inhibiting materials comprising epoxy resins, polyamides, polyurethanes and combinations thereof. An example of a commercially available material is Cathoguard®, available from BASF, being an aqueous emulsion of an epoxy resin with an isocyanate cross-linker. Other examples include Aqua EC 3000 from Herberts and Enviroprime® from PPG.

As indicated above, the pipe elements according to the invention have a very uniform layer of corrosion-inhibiting material. Suitably, the thickness of the layer is in the range of 10 to 30 µm. It is evident that when the thickness of the layer is relatively thin, the aspect of uniformity becomes very important. Although variances in thickness may in absolute terms be relatively small, such variances may be proportionally large and have serious consequences as to the prevention of galling and corrosion. Therefore, thanks to the application via an aqueous cataphoresis bath, the pipe elements according to the present invention have a layer of corrosion-inhibiting material with a uniform thickness, i.e. a thickness does have a variance in thickness of not more than 20 µm. Advantageously, the variance in thickness is at most 6 µm. These degrees of uniformity can be achieved by the cataphoretic application of the corrosion-inhibiting material. Expressed in the format of a standard deviation, the thickness has a standard deviation that is suitably at most 5 µm, more preferably at most 3 µm.

It is known in the art to improve the adherence of resins to oil well pipe components by means of a layer of one or more phosphates. Therefore, the pipe component according to the invention preferably comprises further at least partly a phosphate layer between the layer of corrosion-inhibiting material and the threaded portion of the pipe component. The phosphate layer suitably comprises one or more compounds selected from zinc phosphate, manganese phosphate, nickel phosphate and iron phosphate. Methods for applying such a phosphate layer are known in the art. In that respect reference is made to application WO 2012/010981 wherein such a phosphate layer is applied to the male threaded portions of a pipe element. The thickness of the phosphate layer may typically range from 2 to 20 µm, preferably from 4 to 10 µm. In U.S. Pat. No. 4,233,088 a method is described for inhibiting corrosion and providing a foundation for subsequent application of a coating system to steel surfaces, which method comprises the development of a protective phosphatizing reaction coating based on a metal other than the metal which is to be protected either by an immersion treatment or by a spray treatment with a phosphatizing bath which contains the metal phosphate or metal acid phosphate matter for such a treatment in a status nascendi. Such a state is obtained by the use of an aqueous medium containing phosphate ions derived from an alkali metal phosphate, an alkali metal acid phosphate, phosphoric acid or combinations of those and introducing into the aqueous medium a metal oxide based on a metal other than that which is to be treated, preferably an oxide of the metal group of molybdenum, vanadium, tungsten, titanium, lead, manganese and copper, whereby the metal oxide in the aqueous medium forms with the phosphate ions of the aqueous medium the desired freshly prepared metal phosphate or metal acid phosphate to develop on the treated metal surface the required protective reaction coating. The phosphatizing bath can be modified further by introducing into the aqueous medium a ligand-forming organic polymer which is capable of entering the reaction coating formation and said polymer can further be influenced also by the addition into the aqueous medium of a small amount of an acetylenic alcohol or a dialdehyde. Also a dispersing agent, such as formamide or an alkyl-substituted formamide, can be employed to increase the reactivity of the metal oxide component.

The layer of corrosion-inhibiting material may comprise additional components in addition to the resin that is deposited in the cataphoretic bath. Such additional components may be selected from additional anti-corrosion compounds. Such compounds include e.g. nitrogen-containing compounds and dithiophosphates. It is also possible to select specific resins that have excellent anti-corrosion properties.

It is also feasible to ensure that the layer of corrosion-inhibiting material further comprises a lubricant, preferably particles of a solid lubricant. Preferably, the layer of corrosion-inhibiting material is covered by an additional layer comprising a lubricant, in particular a dry lubricant, preferably particles of a solid lubricant. Due to the lubricant in or onto the layer, the fastening of the pipe components becomes less difficult and galling is reduced or even prevented. The lubricants that can be used in these applications are generally known in the art. Suitable examples of such solid lubricants are molybdenum disulfide, tungsten disulfide, boron nitride, graphite, polytetrafluoroethylene (PTFE), and combinations thereof.

The oil well pipe components suitable for the present invention, include so-called pin members and box members of pipelines used for the drilling and/or production of oil fields. The pipe component according to the present invention is at least one of a sleeve-shaped coupling member for a cylindrical oil well pipe, comprising an internal threaded portion, or a cylindrical oil well pipe comprising an external threaded portion, or both. Persons skilled in the art will realize that it is more feasible to subject a box member to a cataphoresis process than a pin member, just for reasons of size. Therefore, the pipe component is preferably a box member, i.e. a sleeve-shaped coupling member for a cylindrical oil well pipe. Typically such a sleeve-shaped coupling member is provided with internal threaded portions at both ends of the sleeve, which portions are separated from one another by an unthreaded portion. The unthreaded portion may comprise a metal to metal contact section (disposed substantially axially with respect to the axis of the connection) in order to form an airtight seal upon assembling; also the unthreaded portion may comprise an abutment shoulder (disposed substantially radially with respect to the axis of the connection).

The invention also provides an assembly (i.e. a string) of at least two oil well pipes, which are mutually connected by means of a sleeve-shaped coupling member, wherein at least one the assembling parts, preferably including the coupling member, is an oil well component according to the invention. Such an assembly having a threaded joint profits from the advantageous corrosion-inhibiting and galling-reducing properties of the coating that is applied by cataphoresis.

As indicated above, the invention also provides a method for coating an oil well pipe component. An essential step in this method is the application of a corrosion-inhibiting material on the oil well pipe component by means of a cataphoresis in an aqueous bath. The operation of a cataphoresis bath is known in the art. In a cataphoresis process, also known as cathodic electrodeposition, positively charged particles in an electric field are moved toward an oppositely charged metallic surface. In this way the surface is provided with a layer of the particles. This process enables the deposition of a layer of material on surfaces that may be difficult to reach. In addition, it has been found that the process also enables the provision of a layer of uniform thickness. The cataphoresis process may be carried out in a known manner applying a voltage of 50 to 500 V, preferably from 100 to 350 V. The current density suitably ranges from 0.1 to 40 A/m$^2$. As indicated above, the corrosion-inhibiting material suitably comprises a resin that is responsive to an electric field. Typically, the resin is selected from the group consisting of polyolefins, saturated and unsaturated polyesters, alkyd resins, acrylic resins, phenolic resins, epoxy resins and polyurethane resins. It has been found that very good results are obtainable when the corrosion-inhibiting material comprises a basic resin. In particular amino epoxy resins and amino-urethane resins yield very good results. The cataphoretic bath suitably comprises from 55 to 95% wt of water, preferably from 70 to 90% wt of water and 45 to 5% wt, preferably from 30 to 10% wt of corrosion-inhibiting material. The duration of the cathodic deposition may vary in dependence of the desired thickness of the coating, and the voltage and current density applied. Typically, the duration of the cathodic deposition is in the range of 1 to 10 minutes, preferably from 2 to 8 minutes.

Before the surface of the oil well pipe component is being subjected to cathodic electrodeposition, the oil well pipe component may suitably be subjected to a pre-treatment before it is immersed into the cataphoresis bath. Advantageous pre-treatments include degreasing, washing and phosphatisation and combinations thereof. It is also advantageous to subject the surface of the oil well pipe component to a mechanical pre-treatment, in particular an abrasive blasting step. In such a step the surface of the oil well pipe component is roughened by blasting the oil well pipe component with abrasive material, such as sand, glass, alumina, corundum or combinations thereof. The surface thus treated may provide an improved adhesion for the subsequent coating or coatings. Such a subsequent coating is preferably provided by a layer of a phosphate, as described hereinbefore. Thereto, the oil well pipe component, optionally after an abrasive blasting step, is subjected to phosphatizing by spraying with or dipping in a composition comprising zinc phosphate, manganese phosphate, nickel phosphate and/or iron phosphate.

Galling of the threads in oil well pipe components may be reduced or prevented by using a lubricant. Therefore, it is advantageous if the layer on top of the threaded portions of the oil well pipe component also comprises a lubricant. It is advantageous to use suspended particles of corrosion-inhibiting material in the cataphoresis bath which particles further comprise a solid lubricant. In this way the lubricant is evenly spread over the surface of the threaded portion of the pipe component. At the same time it is ensured that the uniformity of the thickness of the layer is not affected. The lubricant that can be used in these applications are generally known in the art. Suitable examples of such solid lubricants are molybdenum disulfide, tungsten disulfide, boron nitride, graphite, polytetrafluoroethylene (PTFE), and combinations thereof. Preferably a lubricant is applied separate from the corrosion-inhibiting material, or if a lubricant is desired in addition to the solid lubricant that is contained in the corrosion-inhibiting material, the pipe component, after having allowed the corrosion-inhibiting material to set, may be at least partly covered, in particular the threaded portion, with a layer of lubricant. In case of a solid lubricant the lubricant may be the same as those mentioned hereinbefore. In such cases the solid lubricant may be comprised in a matrix such as a resin or binder material. Alternatively, a viscous liquid lubricant may be applied. A dry solid lubricant top layer is a preferred embodiment.

When the oil well pipe component, such as a box member for a casing, has been coated with a layer of corrosion-inhibiting material and is taken out of the cataphoresis bath in which it was immersed, the corrosion-inhibiting material is typically allowed to set. The setting of the material, also known as curing, can be done in any known manner. Suitably, the setting is performed by treating the pipe component to a treatment of maintaining at least the threaded portion of the pipe component to an elevated temperature. Suitable temperatures are in the range of 50 to 250° C. This elevated temperature is suitable maintained for a period in the range of 1 to 120 minutes, preferably from 5 to 60 minutes. In this manner the layer of corrosion-inhibiting material is firmly fixed to the surface of the pipe component and at the same time it forms a solid smooth seal layer that prevents water, oxygen and other contaminants from contacting the metallic surface of the pipe component. Excellent results are obtained at a temperature of about 160 to 170° C. for about 30 to 50 minutes.

In accordance with the invention several preferred embodiments can be prepared. A first embodiment comprises a layer of corrosion-inhibiting material that has been deposited by cataphoresis on the surface of an oil well pipe component, for example the box member of a casing or pipeline, which surface may optionally having been subjected to abrasive blasting and/or to the deposition of a phosphate layer. In a second embodiment the layer of corrosion-inhibiting material may further comprise a solid lubricant. Also in this case the surface of the pipe component may have been treated by abrasive blasting and/or phosphatizing. In a third embodiment, the layer of corrosion-inhibiting material, optionally comprising a solid lubricant, and optionally deposited on a surface that has been treated with abrasive blasting and/or phosphatizing, is coated with a layer of a lubricant, which may be a solid, or a solid contained in a matrix, or a liquid, suitably a viscous liquid. The skilled person will realize that other embodiments are also contained in the description of the present invention.

The invention is elucidated by means of the following Figures, wherein.

Figure 1:
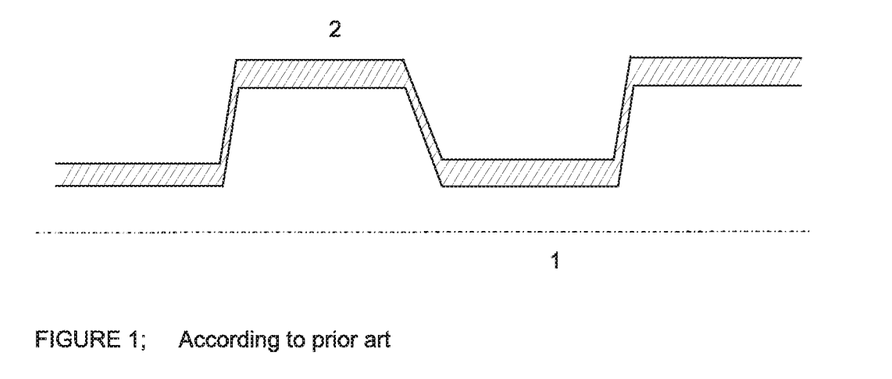
FIG. 1 schematically shows a threaded portion according to the prior art.

FIG. 1 shows a cross-sectional view of a portion of a wall of an oil well pipe component 1 along the axis of the pipe component, to which a layer 2 of a corrosion-inhibiting material has been applied by means of spraying. It is shown how the layer 2 of the corrosion-inhibiting material has a varying thickness along the threaded portion. In particular, the flanks of the threads tend to have a thinner coating that the roots or the crests.

Figure 2:
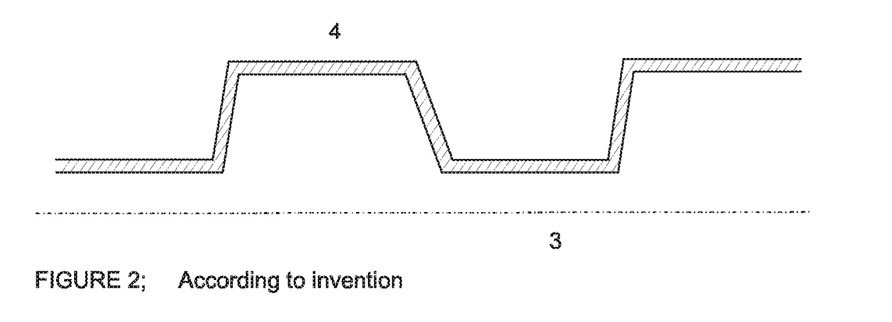
FIG. 2 shows such a threaded portion according to the invention.

In FIG. 2 a similar oil well pipe component 3 is shown whereon a layer of corrosion-inhibiting material 4 has been deposited via cataphoresis. It is shown how the thickness of the layer of corrosion-inhibiting material is uniform along the entire threaded portion. The Figures show the difference in uniformity of the layer thickness, in particular on the flanks of the threaded portions.

The invention will be further elucidated by means of the following Examples.

EXAMPLE 1

A steel box member that is used as an oil well pipe component was in a known way degreased and washed and then phosphatized with manganese phosphate. Then the box member was immersed in a cataphoresis bath containing a commercial cataphoretic paint Cathoguard ®325 and subjected to cataphoretic deposition for about 3 minutes at a voltage of 250-380V. The coating was cured for about 50 minutes at 160° C. Subsequently, a layer of solid lubricant, comprising polytetrafluoroethylene was applied on the layer of corrosion-inhibiting material by spraying the inner threaded portion of the box member by means of a turbine producing a radial spray coating.

Via SEM (scanning electron microscopy) the thickness of the coatings on the threads was determined on the roots, the flanks and the crests of the threaded portion of the box member. The thickness was determined for both the layer of corrosion-inhibiting material and the solid lubricant. The results are shown in the Table 1 below, wherein the values represent the average of various measurements. The variation between the individual values of the thickness of the corrosion-inhibiting material on the flanks was about 4.5 µm, there was virtually no variance on the crest, and the variance on the root was about 0.3 µm.

TABLE 1

|  | Thickness corrosion-inhibiting layer, µm | Thickness solid lubricant, µm |
|---|---|---|
| Flanks | 23.2 | 17.3 |
| Crest | 23.7 | 29.7 |
| Root | 20.6 | 9.00 |

From the results it is clear that the thickness of the layer of corrosion-inhibiting material applied by cataphoresis is much more uniform than the layer of solid lubricant that is applied via spraying.

COMPARATIVE EXAMPLE 1

For comparison reasons an oil well pipe component comprising a threaded portion was pretreated and phosphatized in the manner described in Example 1. The thus treated oil well pipe component was further coated with an epoxy-based corrosion-inhibiting coating according to the teachings of US 2008/129044 by means of spraying, which coating composition also comprised polytetrafluoroethylene as solid lubricant. The thickness of the corrosion-inhibiting coating was determined and the results of the average values are shown in Table 2.

TABLE 2

|  | Thickness corrosion-inhibiting layer, µm |
|---|---|
| Flanks | 19.9 |
| Crest | 84.0 |
| Root | 37.3 |

It was found that the thickness on the flanks, the crest and the root was not very uniform. Moreover, it was found that the variance of the coating on the flanks was about 6 µm, the variance on the crest was about 12 µm, and the variance on the root was about 3 µm.

EXAMPLE 2

The box member of Example 1 was placed in a salt spray chamber and subjected to salt spray tests for 1500 hours in accordance with ASTM B-177. The assessment of the degree of corrosion was determined in accordance with grades of ASTM D-610. According to this ASTM standard, the degree of corrosion is rated from 1 to 10, wherein the various grades represent certain percentages of corroded area, as indicated in Table 3 below.

TABLE 3

| grade | 10 | 9 | 8 | 7 | 6 | 5 | 4 | 3 | 2 | 1 |
|---|---|---|---|---|---|---|---|---|---|---|
| Area,% | 0-0.03 | 0.03-0.1 | 0.1-0.3 | 0.3-1 | 1-3 | 3-10 | 10-16 | 16-33 | 33-50 | 50-100 |

Additional qualifications are given in accordance with the following scale:

| S (spot) | Corrosion localized in small areas |
|---|---|
| G (general) | Corrosion distributed randomly |
| P (pinpoint) | Corrosion present as little dispersed points |
| H (hybrid) | Corrosion can be a combination of any of the above cases |

The threaded portion of one particular specimen showed the following corrosion after subjection to the salt spray tests for the duration as specified in Table 4.

For comparison purposes the box member of Comparative Example 1 was also subjected to this test. The results are also shown in Table 4.

TABLE 4

| Duration, hrs | Corrosion grade, Example 1 | Corrosion grade, Comp. Example 1 |
|---|---|---|
| 48 | 9P | 9P |
| 168 | 9P | 8G |
| 336 | 9P | 7G |
| 504 | 9P | 6G |
| 552 | 9P | 5P |
| 960 | 9P | n.d. |
| 1224 | 8P | n.d. |
| 1512 | 7P | n.d. | n.d. = not determined

These results show that the threaded portion as protected by the layer of corrosion-inhibiting material and solid lubricant shows an excellent corrosion behavior. The results further show that the non-uniformity of the layers in the comparative example leads to more severe corrosion, despite the fact that the corrosion-inhibiting layer has a bigger thickness than the layer in Example 1.

The invention claimed is:

1. An oil well pipe component comprising:
   a threaded portion, wherein the threaded portion is a sleeve-shaped coupling member for a cylindrical oil well pipe;
   a layer of a corrosion-inhibiting material coated on at least a portion of the threaded portion, wherein the corrosion-inhibiting material is at least one resin selected from the group consisting of polyolefins, saturated and unsaturated polyesters, alkyd resins, acrylic resins, phenolic resins, polyamides, epoxy resins, polyurethane resins, and combinations thereof;

a lubricant layer disposed over at least a portion of the corrosion-inhibiting material;

wherein the corrosion-inhibiting material is applied as a uniform layer comprising a variance in thickness of at most 6 μm; and wherein the corrosion inhibiting material layer is coated on at least a portion of the threaded portion by immersing at least a portion of the threaded portion in a cataphoresis bath.

2. The oil well pipe component of claim 1, wherein the corrosion-inhibiting material comprises one or more resins selected from the group consisting of epoxy resins, polyamides, polyurethanes and combinations thereof.

3. The oil well pipe component of claim 1, wherein the lubricant layer comprises a material selected from the group consisting of molybdenum disulfide, tungsten disulfide, boron nitride, graphite, polytetrafluoroethylene (PTFE), and combinations thereof.

4. The oil well pipe component of claim 1, wherein:
the pipe component is a steel box member;
the corrosion-inhibiting material is an aqueous emulsion of an epoxy resin with an isocyanate cross-linker; and
the lubricant layer is a solid lubricant layer comprising polytetrafluoroethylene.

5. The oil well pipe component of claim 1, wherein the threaded portion is an internal threaded portion of a pipe.

6. The oil well pipe component of claim 1, wherein the threaded portion is an external threaded portion of a pipe.

7. The oil well pipe component of claim 1, wherein the corrosion-inhibiting material comprises one or more resins selected from the group consisting of amino epoxy resins, amino-urethane resins and combinations thereof.

8. The oil well pipe component of claim 1, wherein the corrosion-inhibiting material has a thickness from 10 to 30 μm.

9. The oil well pipe component of claim 1, wherein the variance in thickness is less than 6 μm.

10. The oil well pipe component of claim 1, wherein the variance in thickness is less than 5 μm.

11. The oil well pipe component of claim 1, wherein the variance in thickness is less than 3 μm.

12. The oil well pipe component of claim 1, further comprising a layer of phosphorous between the threaded portion and the corrosion-inhibiting material.

13. The oil well pipe component of claim 12, wherein the phosphorous layer has a thickness from 4 to 10 μm.

14. The oil well pipe component of claim 12, wherein the phosphorous layer comprises manganese phosphate.

15. The oil well pipe component of claim 1, wherein the threaded portion covered by the corrosion-inhibiting material comprises flanks, a crest, and a root, wherein variance of the corrosion-inhibiting material is about 4.5 μm on the flanks, about 0 μm on the crests, and about 0.3 μm on the root.

* * * * *